INVENTOR.
Irving S. Houvener though, such panels are utilized for the construction of insulated structures which employ a core material having a relatively low strength. The core material has adhered to at least one, and oftentimes both, of its major surfaces of a higher strength skin such as plywood, aluminum, fiber board and the like. Oftentimes, such panels are utilized to prepare structures for the food industry and other applications where it is undesirable that crevices, openings, projections and the like are present which will permit foreign matter to lodge therein or thereabout. In order to provide a satisfactory insulated panel which will permit rapid assembly, fasteners are frequently incorporated in the edges thereof. Oftentimes such panel structures are assembled upon a base or footing which has less than perfect geometry resulting in minor misalignments between the panels. A number of fasteners or connectors are known which may be recessed within such panel edges. However, many of them suffer from the economic disadvantage of being relatively complex or requiring casting and like expensive methods to produce components and require relatively precise alignment.

United States Patent Office 3,281,169
Patented Oct. 25, 1966

3,281,169
PANEL FASTENER ASSEMBLY WITH ATTACHING FLANGES
Irving S. Houvener, Midland, Mich., assignor to The Dow Chemical Company, Midland, Mich., a corporation of Delaware
Filed Jan. 2, 1964, Ser. No. 335,255
3 Claims. (Cl. 287—20.924)

This invention relates to fasteners and, more particularly, relates to fasteners adapted to be disposed within panels.

A number of panels are utilized for the construction of insulated structures which employ a core material having a relatively low strength. The core material has adhered to at least one, and oftentimes both, of its major surfaces of a higher strength skin such as plywood, aluminum, fiber board and the like. Oftentimes, such panels are utilized to prepare structures for the food industry and other applications where it is undesirable that crevices, openings, projections and the like are present which will permit foreign matter to lodge therein or thereabout. In order to provide a satisfactory insulated panel which will permit rapid assembly, fasteners are frequently incorporated in the edges thereof. Oftentimes such panel structures are assembled upon a base or footing which has less than perfect geometry resulting in minor misalignments between the panels. A number of fasteners or connectors are known which may be recessed within such panel edges. However, many of them suffer from the economic disadvantage of being relatively complex or requiring casting and like expensive methods to produce components and require relatively precise alignment.

It is an object of this invention to provide an improved concealed fastener particularly suited for sandwich panels.

A further object of this invention is to provide an improved fastener for sandwich panels which may be entirely fabricated from sheet metal stampings.

Another object of this invention is to provide an improved fastener for panels which is tolerant of misalignment.

A further object is to provide an improved fastener which allows the portions of the fastener to be brought together with considerable force.

These benefits and other objects of the present invention are achieved by providing (a) a strike, the strike comprising a sheet-like body portion having a latch engaging edge, adjacent said latch engaging edge and disposed on at least one of the major surfaces thereof a boss adapted to engage a latch; (b) a latch member comprising a sheet like body adapted to engage the strike in a generally edge to edge relationship, the sheet body having defined therein an aperture generally opposite and adjacently disposed to the boss of the strike, a freely rotatable member disposed within said aperture, the rotatable member being terminated on opposite sides of the sheet body by means to retain the rotatable member within the sheet the retaining means defining a flange lying in a generally spiral pattern in a plane parallel to the plane of the adjacent portion of the sheet body and adapted to engage and release the strike boss on rotation of the rotatable member, and means to rotate the rotatable member.

Further features and advantages of the present invention will become more apparent from the following specification when taken in connection with the drawings, wherein.

Figure 2:
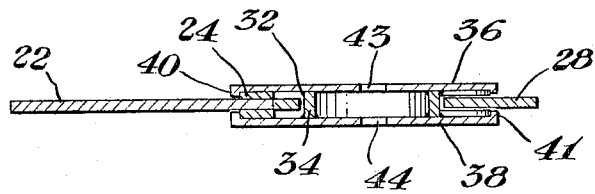
FIGURE 2 is a sectional view of the fastener of FIGURE 1.
Figure 1:
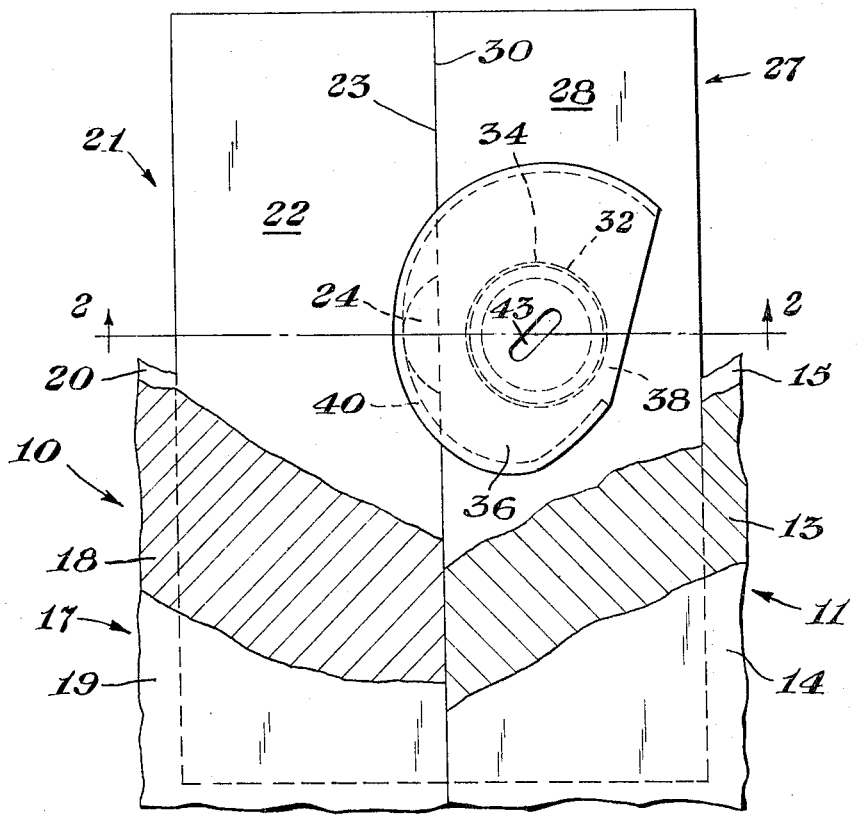
FIGURE 1 illustrates a view of a fastener in accordance with the invention joining two panels.

In FIGURES 1 and 2 there is illustrated a cutaway view of a panel assembly generally designated by the reference numeral 10. The assembly 10 comprises a sandwich panel 11 comprising a core 13 and skins 14 and 15. The panel 11 is in abutting relationship with a similar panel 17. The panel 17 comprises a core 18 and skins 19 and 20. A strike 21 is positioned within the core 18 of the panel 17. The strike 21 comprises a generally sheet-like body portion 22 having a latch engaging edge 23. On a portion of the outer surface of the latch engaging edge 23 is disposed a boss 24. The edge 23 of the strike 22 is generally colinear with the abutting edges of the panels 11 and 17. A latch member 27 is disposed within the core 13 of the panel 11. The latch member 27 comprises a generally sheet like body 28 having a strike engaging edge 30. An aperture 32 is defined by the body 27 generally adjacent the strike engaging edge 30 and generally opposite to the boss 24. A generally cylindrical freely rotatable member 34 is positioned within the aperture 32, the rotatable member being terminated on opposite sides or external surfaces of the body 27 by retaining means 36 and a similar oppositely disposed generally mirror image retaining means 38. The retaining means 36 is provided with a dependent flange 40 which lies in a spiral pattern on a major portion of the circumference of the retaining means 36. A similar generally mirror image flange 41 is secured to the retaining means 38. The flanges 40 and 41 depend toward the body 28. The retaining means 36 defines a central rotating means or elongated aperture 43. A similar aperture 44 is provided in retaining means 38. The latching mechanism in accordance with the present invention is readily engaged and disengaged by rotation of the rotatable member which causes the spirally positioned flanges to engage the bodies or bosses on the strike member and thereby urge the edges of the strike and latch portions together. The path of the spiral is chosen to provide sufficient frictional resistance to motion that no tendency for the latch to open under tension is found. The spiral pattern is readily chosen by utilizing well known frictional data. However, if maximum strength is desired the inner surface of the spiral flange and/or the boss may be serrated if desired. Generally, it is desirable if the spiral flange extends about the rotatable member for about 270°.

Advantageously, such a fastener is readily fabricated from sheet metal by punching, spot welding and the like, providing a fastener of especially low cost and one of minimum width which is readily incorporated into sandwich panels by means of slotting the low strength core, adhering the body portions such as the body portions 22 and 28 to the core. Alternately, if desired, such fasteners are easily attached to panel skins by conventional fastening means including adhesives, rivets, screws and the like.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A fastener assembly comprising a strike, the strike comprising a sheet body portion having external major surfaces and a latch engaging edge, a boss adjacent the latch engaging edge and disposed on at least one of the external major surfaces of the strike, a latch member comprising a sheet body adapted to engage the strike in a generally edge-to-edge relationship, the sheet body of the latch having defined therein an aperture generally opposite and adjacently disposed to the boss of the strike when the strike and boss are positioned in edge-to-edge relationship, a generally flat rotatable member disposed within the aperture, the member being terminated on opposite external sides of the sheet body by means to retain the rotatable member within the sheet of the latch, the retaining means defining a flange and lying in a generally spiral pattern in a plane generally parallel to the plane of the adjacent portion of the sheet body of the latch, the flange being dependent toward the external surface of the body of the latch, the flange adapted to engage and release the strike boss on rotation of the rotatable member and means to rotate the rotatable member.

2. A fastener assembly comprising a strike, the strike comprising a sheet body portion having a latch engaging edge and external major surface, a boss disposed on each of the external major surfaces of the strike adjacent the latch engaging edge, each of the bosses having mirror image symmetry about the plane of the strike, a latch member comprising a sheet body adapted to engage the strike in generally edge-to-edge relationship, the sheet body having external surfaces having defined therein a generally circular aperture extending between each of the major surfaces and being positioned to lie generally oppposite the boss of the strike when the strike and latch assembly are placed in edge-to-edge mating relationship, a generally cylindrical freely rotatable member disposed within the aperture, the freely rotatable member being terminated on either end by generally flat plate-like members having generally mirror image symmetry, each of the plate-like members having a circumferential flange dependent therefrom toward the body of the latch, the flange lying in a spiral configuration and adapted to engage and disengage the strike boss on rotation of the rotatable member, at least one of the plate-like members being provided with means to rotate the rotatable member.

3. The fastener assembly of claim 2 wherein the sheet-like portions extend about the rotatable member for about 270°.

References Cited by the Examiner
UNITED STATES PATENTS 2,301,078 11/1942 Perron _____ 292—202
2,581,816 1/1952 Schlueter _____ 20—92.4

FOREIGN PATENTS 563,849 9/1958 Canada.

FRANK L. ABBOTT, *Primary Examiner.*

R. A. STENZEL, *Assistant Examiner.*